United States Patent [19]

Arnall

[11] Patent Number: 4,654,974
[45] Date of Patent: Apr. 7, 1987

[54] CALIPER

[76] Inventor: Harry L. Arnall, Lot 3, Enterprise Drive, Berkeley Vale, New South Wales, 2259, Australia

[21] Appl. No.: 811,007

[22] Filed: Dec. 19, 1985

[30] Foreign Application Priority Data

Jan. 4, 1985 [AU] Australia .................. PG8767

[51] Int. Cl.$^4$ .................................. G01B 3/38
[52] U.S. Cl. .......................... 33/149 B; 33/149 R
[58] Field of Search ............. 33/149 R, 149 B, 148 E, 33/148 F, 150, 153 C

[56] References Cited

U.S. PATENT DOCUMENTS

| | | | |
|---|---|---|---|
| 1,182,715 | 5/1916 | Severance et al. | 33/149 R |
| 1,290,294 | 1/1919 | Mossman | 33/149 B |
| 1,879,941 | 9/1932 | McCabe | 33/148 E |
| 3,011,262 | 12/1961 | Allen et al. | 33/149 R |
| 3,014,281 | 12/1961 | Caporicci | 33/149 R |

Primary Examiner—Willis Little

Attorney, Agent, or Firm—Stiefel, Gross, Kurland & Pavane

[57] ABSTRACT

The present invention discloses a thickness measuring caliper comprising a pair of legs in fixed spacial relationship, one leg of said pair is elongated and curved along its length and has a free end adapted for engagement with a surface of a member the thickness of which is to be measured, the other leg of said pair is elongated and has a free end which lies adjacent the free end of the first leg and is spaced therefrom by at least the maximum thickness to be measured by the caliper, an elongated third leg curved along its length is pivotally connected at one end to said other leg and the other end of the third leg is adapted for engagement with a surface of a member the thickness of which is to be measured and is aligned with and engageable with the free end of said one leg, said other leg and said third leg have overlying portions to provide a measuring assembly with a registration marking on one of said portions and a scale on the other of said portions whereby a direct reading of the spacing apart of said free end of said one leg and said other end of the third leg can be made.

3 Claims, 1 Drawing Figure

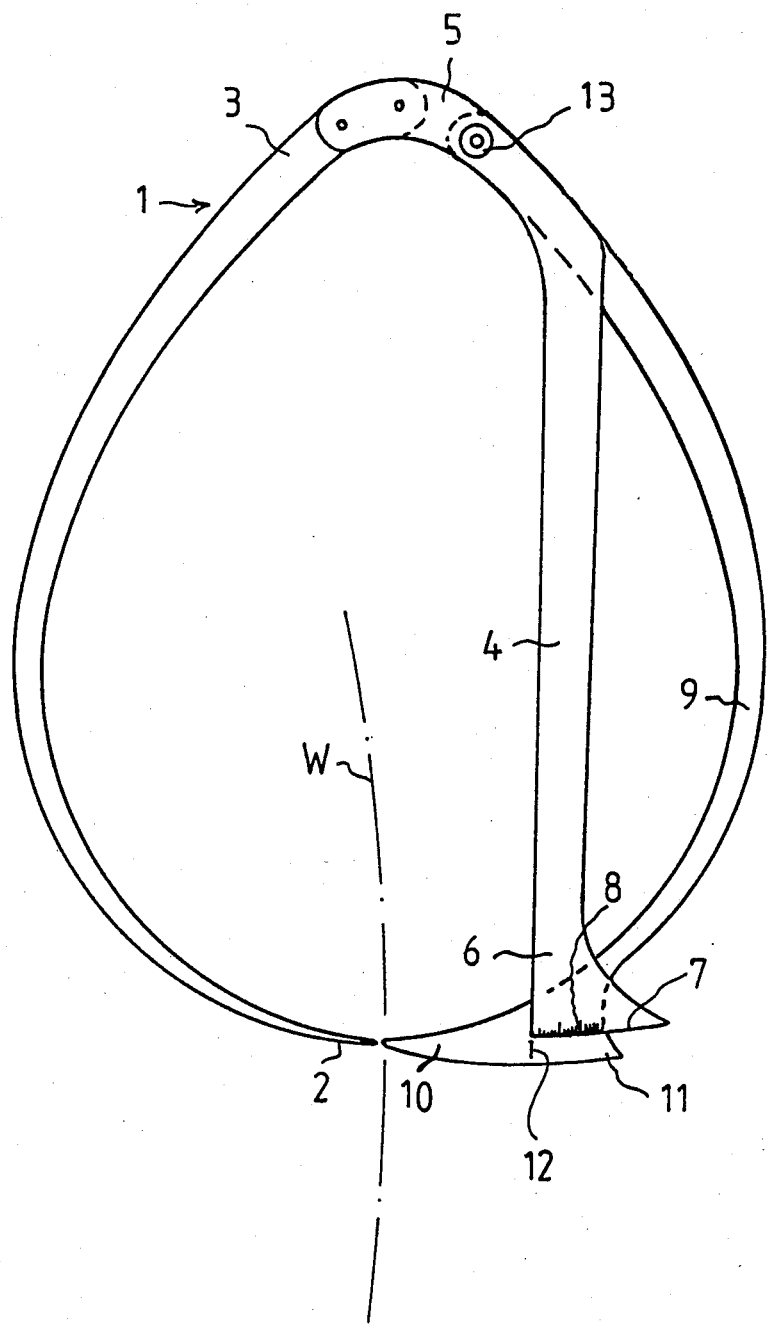

CALIPER

This invention relates to calipers for measuring the thickness of a member.

Calipers have been in common use for hundreds of years and are usually of one of two forms. The inside caliper, used for the measurement of internal diameters and the external caliper used for the measurement of the outside diameter or like measurement of an article or the thickness of an article, e.g. a sheet of metal.

However, none of the known forms of calipers or other measuring devices can be used to monitor the thickness of the wall of an article being formed. An example is in the machining of the wall thickness of a wooden vase. This invention provides a means to directly monitor the wall thickness and at the same time to have a direct and accurate reading of the wall thickness.

Broadly, the invention can be said to comprise a thickness measuring caliper comprising an elongated first leg curved along its length and having one end adapted for engagement with a surface of a member the thickness of which is to be measured, an elongated second leg fixed at one end to the other end of the first leg and with the other end of the second leg adjacent the said one end of the first leg and spaced therefrom by at least the maximum thickness to be measured by the caliper, an elongated third leg curved along its length and pivotally connected at one end to the second leg adjacent the junction of the first and second legs, the other end of the third leg being adapted for engagement with a surface of a member the thickness of which is to be measured and being aligned with and engagable with said one end of the first leg, a registration surface on the second leg and a scale on the third leg with the registration surface overlying said scale so as to indicate the spacing apart of said one end of the first leg and said other end of the third leg.

A preferred embodiment of the present invention will now be described with reference to the accompanying drawing which is a plan view showing the caliper in the zero reading configuration.

Referring to the drawing, there is a first leg 1 which is elongated and tapered and increases in width from one end 2 to the other end 3. The leg 1 is curved along its length. There is a second leg 4 which is elongated and straight with a bent end part 5 which is fixed by rivets to the end 3 of the leg 1. At its free end the leg 4 has an enlarged portion 6 with an edge 7 along which there are markings 8.

There is a third leg 9 which is tapered like the leg 1 and has a narrow first end 10 and an adjacent enlargement 11 on which there are markings 12. At its other end the leg 9 is pivotally connected at 13 to the leg 4. It is to be noted that the leg 4 overlies the leg 1 in the region of their interconnection and the leg 9 lies below the leg 4. It follows therefore that the ends 2 and 10 of the legs 1 and 9 will lie in the same plane and can meet end to end. The ends 2 and 10 are rounded and of such section that they will bear without penetration on the surface of materials which are not hard, e.g. timber.

Shown in broken outline is the curved wall W of an article to be thickness measured. In practice the caliper of this invention is used with the leg 1 entered through the open end of the article being formed, e.g. the open top of a vase, and the end 2 thereof will bear on the inner surface of the hollow body. The end 10 of the leg 9 will be brought to bear on the outer surface of a wall W and the thickness at the place where the ends 2 and 10 bear can be read off the scale on the portions 6 or 11 depending on how and on which portion the scale of markings is positioned. The scale would be zeroed when the ends 2 and 10 of the legs 1 and 9 are in abutting engagement. In this way a direct and accurate reading of the wall thickness can be made.

In the specific example the legs 1 and 4 are separate members rivetted together. Naturally this is only one embodiment of the invention and the legs 1 and 4 could be formed from a single piece of material with a crank in the leg 4 to allow the underface of the leg 4 to be on the same level as the upper face of the leg 1. This allows the leg 9 to be pivotally mounted as discussed above so the ends 2 and 10 of the legs 1 and 9 can still meet end to end.

The caliper is of particular assistance where the entry into the turned hollow article is narrow. The curvature of the leg 1 and it narrowness allows accurate wall thickness measurements to be made immediately and comparative measurements to be made along the length of the wall so the craftsman immediately knows where there is material still to be removed in order to achieve uniform wall thickness for the article.

The claims defining the invention are as follows.

I claim:

1. A thickness measuring caliper comprising first and second legs in fixed spatial relationship, said first leg of said pair being elongated and curved along its length and having a free end adapted for engagement with a surface of a member the thickness of which is to be measured, the second leg of said pair being elongated and having a free end which lies adjacent the free end of the first leg and is spaced therefrom by at least the maximum thickness to be measured by the caliper, an elongated third leg curved along its length and pivotally connected at one end to said second leg, the other end of the third leg being adapted for engagement with a surface of a member the thickness of which is to be measured and being aligned with the free end of said first leg, said second leg and said third leg having overlying portions to provide a measuring assembly with a registration marking on one of said portions and a scale on the other of said portions whereby a direct reading of the spacing apart of said free end of said first leg and said other end of said third leg can be made.

2. A thickness measuring caliper comprising an elongated first leg curved along its length and having one end adapted for engagement with a surface of a member the thickness of which is to be measured, an elongated second leg fixed at one end to the other end of the first leg and with the other end of the second leg adjacent the said one end of the first leg and spaced therefrom by at least the maximum thickness to be measured by the caliper, an elongated third leg curved along its length and pivotally connected at one end to the second leg adjacent the junction of the first and second legs, the other end of the third leg being adapted for engagement with a surface of a member the thickness of which is to be measured and being aligned with and engagable with said one end of the first leg, a registration surface on the second leg and a scale on the third leg with the registration surface overlying said scale so as to indicate the spacing apart of said one end of the first leg and said other end of the third leg.

3. A caliper as claimed in claim 1 wherein the first and second legs are rivetted together with said second leg overlying said first leg where they are connected together and wherein said third leg is pivotally connected to the underface of said second leg of said pair so as to lie in the same plane as said first leg of said pair.

* * * * *